US011425607B2

(12) United States Patent
Centonza et al.

(10) Patent No.: US 11,425,607 B2
(45) Date of Patent: Aug. 23, 2022

(54) MANAGEMENT OF UPLINK BITRATES

(71) Applicant: Telefonaktiebolaget LM Ericsson (publ), Stockholm (SE)

(72) Inventors: Angelo Centonza, Stockholm (SE); Martin Skarve, Enebyberg (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/763,590

(22) PCT Filed: Nov. 16, 2018

(86) PCT No.: PCT/SE2018/051189
§ 371 (c)(1),
(2) Date: May 13, 2020

(87) PCT Pub. No.: WO2019/098936
PCT Pub. Date: May 23, 2019

(65) Prior Publication Data
US 2020/0288351 A1   Sep. 10, 2020

Related U.S. Application Data

(60) Provisional application No. 62/587,904, filed on Nov. 17, 2017.

(51) Int. Cl.
*H04W 28/22* (2009.01)
*H04L 43/0894* (2022.01)
*H04W 28/12* (2009.01)

(52) U.S. Cl.
CPC ......... *H04W 28/22* (2013.01); *H04L 43/0894* (2013.01); *H04W 28/12* (2013.01)

(58) Field of Classification Search
CPC . H04W 28/22; H04W 28/12; H04W 28/0215; H04W 28/16; H04W 28/0252;
(Continued)

(56) References Cited

U.S. PATENT DOCUMENTS

2006/0182065 A1* 8/2006 Petrovic ................. H04L 47/12
370/332
2009/0086705 A1* 4/2009 Zisimopoulos ... H04W 72/1268
370/347

(Continued)

FOREIGN PATENT DOCUMENTS

GB           2528988 A       2/2016

OTHER PUBLICATIONS

3GPP, "3rd Generation Partnership Project; Technical Specification Group Radio Access Network; NG-RAN; Architecture description (Release 15)", 3GPP TS 38.401 V0.4.1, Oct. 2017, pp. 1-25.
(Continued)

*Primary Examiner* — Jeffrey M Rutkowski
*Assistant Examiner* — Sudesh M Patidar
(74) *Attorney, Agent, or Firm* — Sage Patent Group

(57) ABSTRACT

In one aspect, one or more network nodes are configured to manage bitrates for dedicated radio bearers (DRBs) for a UE served by two or more distributed transmission units, where the DRBs include at least one DRB terminating at a first control unit and at least one DRB terminating at a second control unit. The network nodes determine at least a first UL AMBR value for the UE for the first control unit and at least a second UL AMBR value for the UE for the second control unit. The network nodes then signal the first UL AMBR to the first control unit and the second UL AMBR to the second control unit, for enforcement by the first and second control units.

12 Claims, 15 Drawing Sheets

(58) Field of Classification Search
CPC ......... H04W 28/0257; H04W 28/0263; H04W 28/0268; H04W 76/15; H04W 76/16; H04W 76/20; H04W 72/0406; H04W 72/0433; H04W 72/1257; H04W 24/08; H04W 24/02; H04W 24/04; H04W 8/18; H04W 8/186; H04W 8/22; H04W 8/24; H04L 43/0894; H04L 41/5019; H04L 47/20; H04L 47/10; H04L 47/2425; H04L 47/26; H04L 47/266; H04L 47/805; H04L 47/823

See application file for complete search history.

(56) References Cited

U.S. PATENT DOCUMENTS

| | | | | |
|---|---|---|---|---|
| 2015/0282152 | A1* | 10/2015 | Wang | H04W 28/0815 370/329 |
| 2017/0026982 | A1* | 1/2017 | Koskinen | H04W 72/12 |
| 2017/0034756 | A1* | 2/2017 | Faccin | H04W 16/14 |
| 2017/0280348 | A1 | 9/2017 | Xu et al. | |
| 2017/0303322 | A1* | 10/2017 | Watfa | H04W 28/24 |
| 2018/0115921 | A1* | 4/2018 | Chen | H04W 28/12 |
| 2019/0082349 | A1* | 3/2019 | Chen | H04W 28/22 |
| 2019/0098529 | A1* | 3/2019 | Park | H04L 1/08 |
| 2019/0098544 | A1* | 3/2019 | Han | H04W 36/08 |
| 2020/0067689 | A1* | 2/2020 | Wang | H04L 5/0096 |
| 2020/0068445 | A1* | 2/2020 | Wu | H04W 36/0066 |
| 2020/0092753 | A1* | 3/2020 | Liu | H04W 28/0933 |

OTHER PUBLICATIONS

3GPP, "3rd Generation Partnership Project; Technical Specification Group Radio Access Network; NG-RAN; Architecture description (Release 15)", 3GPP TS 38.401 V0.2.0, Jul. 2017, pp. 1-20.
Unknown, Author, "Evaluation of CP/UP separation", 3GPP TSG RAN WG3 AdHoc NR; R3-172308; Qingdao, China, Jun. 27-29, 2017, pp. 1-4.
Unknown, Author, "Flow QoS Support in Dual Connectivity", 3GPP TSG-RAN WG3 #96; R3-171796; Hangzhou, China, May 15-19, 2017, pp. 1-2.
Unknown, Author, "General principles of separation of CP and UP for high level functional split", 3GPP TSG RAN WG3 Meeting NR#2; R3-172285; Qingdao, China, Jun. 26-28, 2017, pp. 1-5.
Unknown, Author, "TP for XnAP on bearer harmonisation", 3GPP TSG-RAN WG3 Meeting #97bis; R3-174071; Prague, Czech Republic, Oct. 9-13, 2017, pp. 1-39.
European Office Action for European Patent Application No. 18811080.3 dated Mar. 9, 2021, 8 pages.
Huawei et al., 3GPP TSG-RAN WG2 NR Adhoc#2, R2-1707421, "UE-AMBER Enforcement in EN-DC", Qingdao, China, Jun. 27-29, 2017, 4 pages, XP051307449.

* cited by examiner

MANAGEMENT OF UPLINK BITRATES

TECHNICAL FIELD

The present invention relates to wireless communication networks, and particularly relates to one or more network nodes that manage bitrates for dedicated radio bearers (DRBs) for a UE served by two or more distributed transmission units, where the DRBs include at least one DRB terminating at a first control unit and at least one DRB terminating at a second control unit.

BACKGROUND

FIG. 1 illustrates the current 5G radio access network (RAN), or NG-RAN, architecture, as described in 3GPP TS 38.401, v. 0.3.0. The NG-RAN consists of a set of gNBs connected to the 5G core (5GC) through the NG logical interface, where a gNB may be regarded as a base station for the NG-RAN. A gNB can support frequency division duplex (FDD) mode, time division duplex (TDD) mode or dual mode operation. gNBs can be interconnected through the Xn logical interface. A gNB may consist of a gNB central unit (gNB-CU) and gNB distributed units (gNB-DUs). A gNB-CU and a gNB-DU are connected via an F1 logical interface. One gNB-DU is connected to one gNB-CU. For resiliency, a gNB-DU may be connected to multiple gNB-CUs by appropriate implementation. Note that a "gNB" can be understood to be a logical node, which may be implemented in one or several physical nodes. For example, one or several gNB-DUs that make up part of a given gNB may be implemented in hardware that is physically separated (in some cases by large distances) from each other and/or from the gNB-CU. Note that in the discussion that follows, the gNB-CU and gNB-DU may sometimes be referred to as simply "CU" and "DU," respectively.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The architecture in FIG. 1 can be expanded by splitting the gNB-CU into multiple entities. As shown in FIG. 2, this includes two gNB-CU-UPs 204, 206, which serve the user plane and hosts the Packet Data Convergence Protocol (PDCP) protocol, and one gNB-CU-CP 202, which serves the control plane and hosts the PDCP and Radio Resource Control (RRC) protocols. The gNB-CU-CP 202 and the gNB-CU-UPs 204, 206 are logical entities, and may be implemented in the same or different physical units.

It is possible for a user equipment (UE) 212 to be served by dedicated radio bearers (DRBs) via more than one DU. It is also possible that the DRBs setup for UE 212 are served by more than one CU-UP. The mapping between traffic flows received by the gNB and the DRBs to be setup to serve UE 212 is decided by CU-CP 202. The decision of which CU-UP supports each DRB is also made by CU-CP 202. In the example shown by FIG. 2, CU-CP 202 may decide to setup four DRBs (214, 216, 220, 222), served by DU1 208 and DU2 210 and terminated at CU-UP1 204 and CU-UP2 206, to serve the same UE 212 and to transport traffic that belongs to the same traffic flow.

In 5G, network slicing is one of the key capabilities that will enable flexibility, as it allows multiple logical networks to be created on top of a common shared physical infrastructure. This will allow operators to split a single physical network into multiple virtual networks, where each of these virtual networks may be referred to as a "network slice" and may, for example, offer different or overlapping services with a variety of quality-of-service levels. It will be appreciated that with network slicing, gNBs can be handling DRBs associated with multiple network slices, at any given time. These network slices may typically serve different groups of wireless devices, but it is possible that a single device is served by multiple network slices.

UE aggregate maximum bit rate (AMBR) is a parameter that is part of the subscriber profile and that specifies the maximum total bit rate a UE can be served with, for non-GBR traffic. There is no current solution for how to handle and enforce AMBR values for uplink (UL) traffic in cases of multi-connectivity. In particular, it is not currently possible to manage UL AMBR limits so that traffic can be flexibly distributed among different DRBs of the same UE, where these DRBs have the same CU-UP termination. There is also no current solution for how the UL AMBR can be enforced or kept within the limits of the assigned UL AMBR.

SUMMARY

The embodiments described herein provide a solution for how the UL AMBR could be managed and how UL bitrates could be enforced. The solution allows for management of limitations in the use of Autonomous Uplink (AUL) resources and for control of a radio system in the case that such limitations are not respected. The solution also reduces RAN complexity and improves RAN performance.

According to some embodiments, a method may use one or more network nodes of a wireless communication system for managing bitrates for DRBs for a UE served by two or more distributed transmission units, where the DRBs include at least one DRB terminating at a first control unit and at least one DRB terminating at a second control unit. The method includes determining at least a first UL AMBR value for the UE for the first control unit and at least a second UL AMBR value for the UE for the second control unit. The method also includes signaling the first UL AMBR to the first control unit and signaling the second UL AMBR to the second control unit, for enforcement by the first and second control units.

The signaling may be carried out by a gNB central unit (CU) for the control plane (gNB CU-CP), and the first and second control units may be first and second gNB central units for the user plane (gNB CU-UPs).

According to some embodiments, a method for managing bitrates for DRBs for a UE served by two or more distributed transmission units (the DRBs including at least one DRB terminating at a first control unit and at least one DRB terminating at a second control unit), includes, for one or more network nodes acting as the first control unit, receiving signaling indicating at least a first UL AMBR value for the UE and enforcing the first UL AMBR value for the UE.

According to some embodiments, one or more network nodes of a wireless communication system configured to manage bitrates for DRBs for a UE served by two or more distributed transmission units include communication circuitry and processing circuitry operatively associated with the communication circuitry. The DRBs include at least one DRB terminating at a first control unit and at least one DRB terminating at a second control unit, The processing circuitry is configured to determine at least a first UL AMBR value for the UE for the first control unit and at least a second UL AMBR value for the UE for the second control unit and signal the first UL AMBR to the first control unit and signal the second UL AMBR to the second control unit, for enforcement by the first and second control units.

According to some embodiments, one or more network nodes of a wireless communication system configured to manage bitrates for DRBs for a UE served by two or more distributed transmission units include communication circuitry and processing circuitry operatively associated with the communication circuitry. The DRBs include at least one DRB terminating at a first control unit and at least one DRB terminating at a second control unit, and the one or more network nodes are configured to act as a first control unit. The processing circuitry is configured to receive signaling indicating at least a first UL AMBR value for the UE and enforce the first UL AMBR value for the UE.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION

Embodiments described herein provide a solution for UL AMBR management and enforcement for split DRBs in a 5G split architecture. In this description, the terms CU-UP and CU-CP are used to identify the entities within a central unit (CU) that are responsible for the user plane (UP) and the control plane (CP). For example, a CU-UP and CU-CP may be represented by a gNB-CU-UP and gNB-CU-CP.

Figure 1:
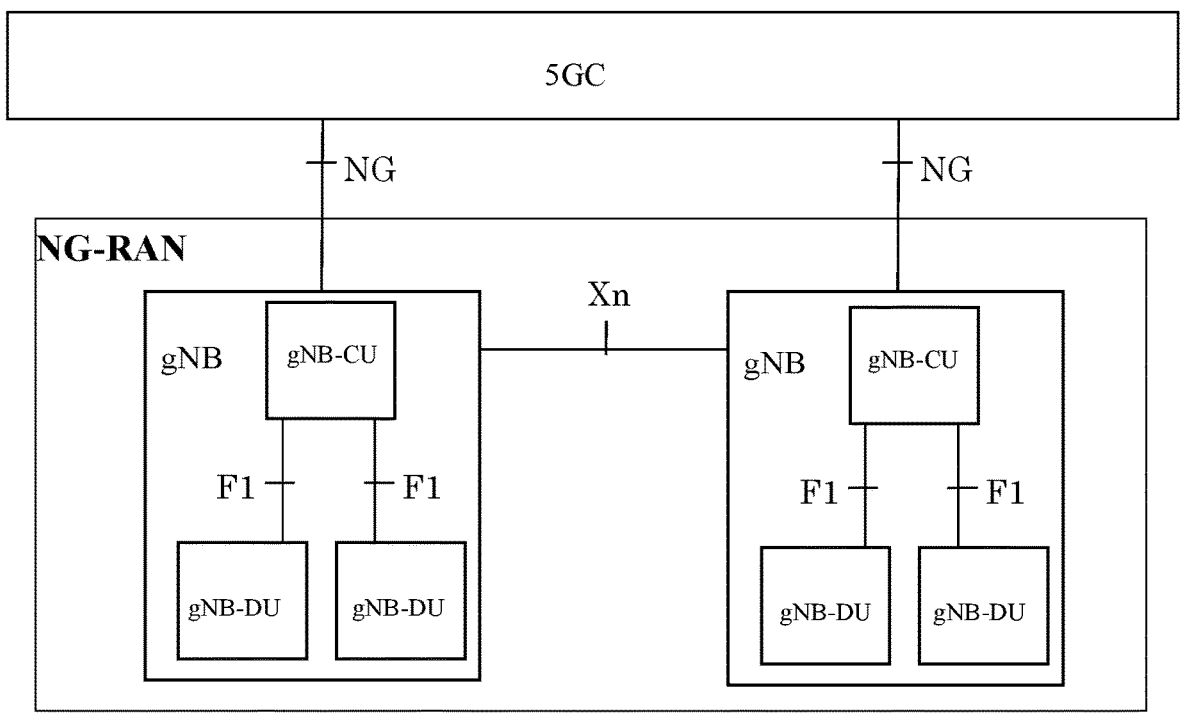
FIG. 1 is a block diagram illustrating the overall NG architecture.
Figure 2:
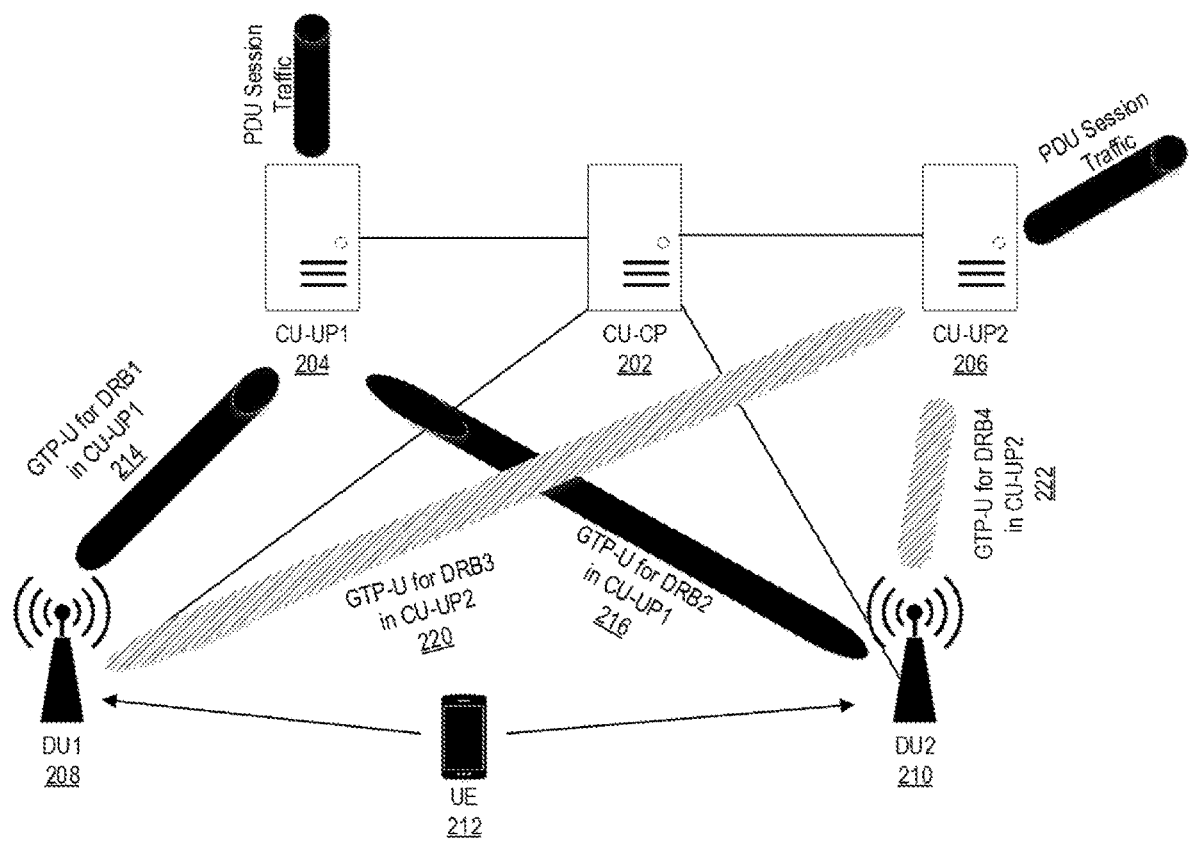
FIG. 2 illustrates example of mapping between traffic flow and DRBs.
Figure 3:
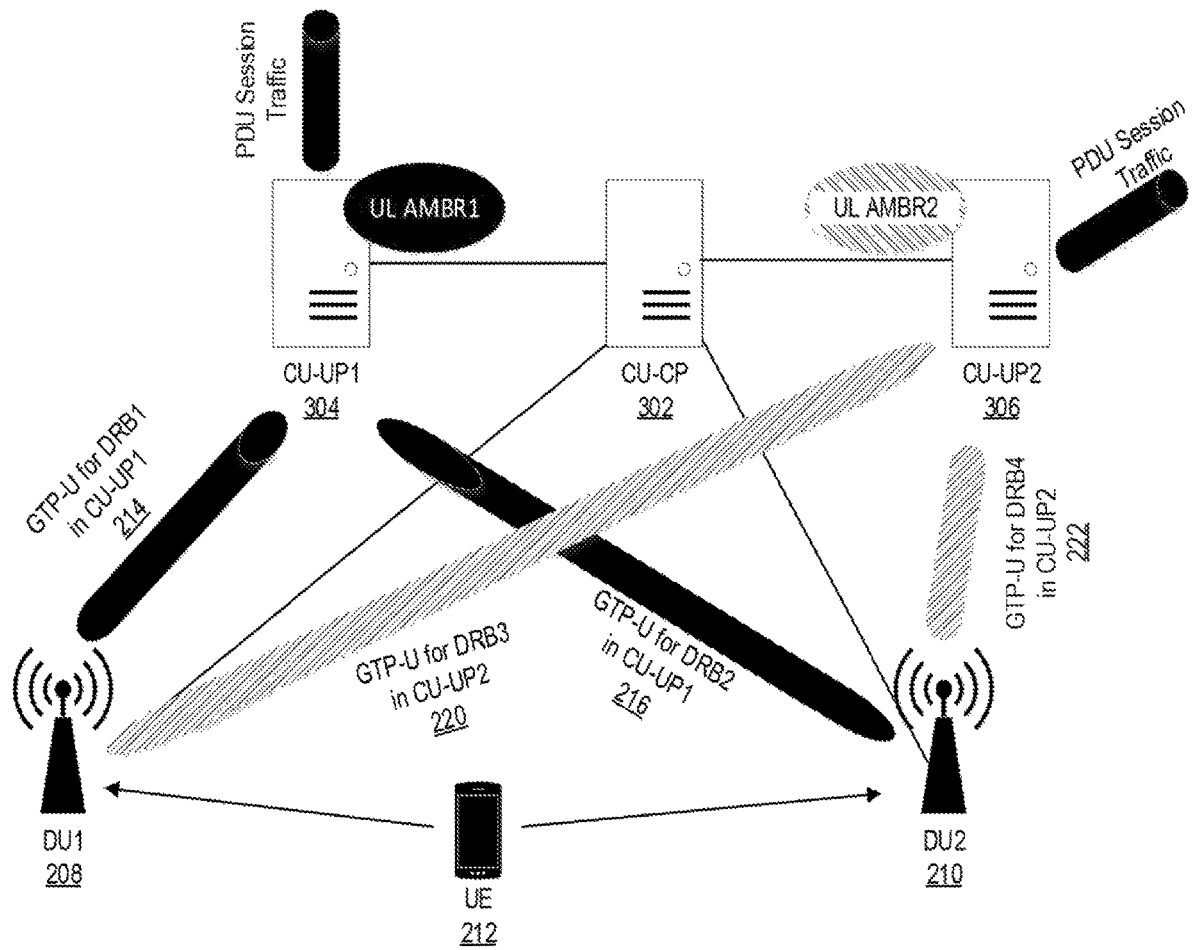
FIG. 3 illustrates signaling UL AMBRs, according to some embodiments.

FIG. 3 will be used to describe embodiments of the solution, in the scenario where traffic for quality of service (QoS) flows of one or more packet data unit (PDU) sessions is served via multiple DRBs (i.e., served via a "spit bearer"). DRB1 and DRB2 are legs of one split bearer, while DRB3 and DRB4 are legs of another split bearer. A set of DRBs may handle the same traffic flows or may be associated with the same network slicing, in various embodiments.

One objective of the solution includes being flexible as to how UL traffic is delivered via various DRBs terminating at the same CU-UP. Namely, in the case where capacity over a DRB diminishes, UL traffic can be delivered over one or more available DRBs with termination in the same UP PDCP entity, i.e., in the same CU-UP. For example, this flexibility is for moving volumes of UL traffic between DRB1 214 in CU-UP1 and DRB2 216 in CU-UP1, as well as between DRB3 220 in CU-UP2 and DRB4 222 in CU-UP2. For instance, if the link to DU2 210 goes down, all traffic shall be moved to DU1 208.

Another objective of the solution is to be able to control the UL traffic bitrates for a given UE, compare them with established limits, and detect when the UL bitrates exceed the established UL AMBR limits. This includes controlling UL rates with respect to a UL AMBR at CU-UP 304, 306 and enforcing UL AMBR in CU-CP 302. The CU-CP 302 is allowed to send signals to DU1 208 or DU2 210 to throttle traffic in UL if AMBR is exceeded.

Yet another objective is to be able to, upon detection of a breach of UL AMBR values, highlight the event and trigger actions that restore the UL bitrate to within the allowed limits.

In order to achieve these objectives, embodiments of the solution may involve multiple tasks. One task is to determine, at the CU-CP 302, or at a function of the radio access node (RAN) node in charge of managing UL AMBR values, values of the UL AMBR on a per CU-UP termination. Namely, for a given UE 212 subject to an overall UL AMBR, the total UL AMBR is partitioned on a per UL PDCP user plane termination, e.g., on a per CU-UP termination. As per FIG. 3, this could result in CU-CP 302 determining two values of the UL AMBR for a UE, UL AMBR1 to be assigned to CU-UP1 304 and UL AMBR2 to be assigned to CU-UP2 306. Each of these UL AMBR values represents the maximum UL AMBR for the UL traffic of all the UE DRBs terminating at that same particular CU-UP. The UL AMBRs could be determined based on the QoS traffic class and attributes received from the 5GC.

UL AMBR1 and UL AMBR2 may also be considered sub-values that are assigned to each UL PDCP termination. UL AMBR sub-values may be determined with a finer granularity. For example, sub-values could be determined on a per DRB or DRB group level. In this case, the sub-value would apply to the UL bitrate for the traffic aggregated for the one or more DRBs.

UL AMBR1 and UL AMBR2 may also be sent to UE 212, where UE 212 should respect the UL AMBR values. The UL AMBRs may be sent via radio resource control (RRC) signaling. The UE may be informed of a mapping between a UL AMBR value and a list of DRBs, where all DRBs in the list terminate at the same UP PDCP entity. UE 212 may have other DRBs terminating at, for example, CU-UP2 306. If so, a UL AMBR for those DRBs should be derived and sent to UE 212 and CU-UP2 306.

Another task may include configuring the CU-UPs, or in general configuring the network functions hosting the UL PDCP UP termination point, with the UL AMBR sub-values by means of signaling from CU-CP 302 to CU-UPs 304, 306. The signaled configuration may include a mapping between an UL AMBR value and a list of DRBs, where all DRBs in the list terminate at the same UP PDCP entity.

Enforcement tasks may include monitoring the UL traffic bitrate at each UP UL PDCP termination point. This involves CU-UPs 304, 306 monitoring UL UP traffic for DRBs associated with a given UL AMBR and enabling detection of an overall UL bitrate in excess of the determined UL AMBR. CU-UP1 304 and CU-UP2 306 each check UL bitrates against the respective UL AMBR. The respective CU-UP informs CU-CP 302 if the assigned UL AMBR is exceeded.

CU-CP 302 enforces the UL AMBRs. If CU-UP1 304 or CU-UP2 306 detects that a UL AMBR is exceeded, it sends signaling to DU 208 and/or DU 210 to reduce UL bitrates. CU-CP 302 may trigger further actions towards the DU 208, 210, such as removal of specific DRBs, signaling of recommended bit rate limitations per DRB or per DRB group, and/or signaling to the core network of the event of UL AMBR breach. Alternatively, upon detection of a breach of UL AMBR, CU-UP 304, 306 may signal directly to DUs 208, 210 instructions for how to limit traffic in the UL. For example, CU-UP1 304 may signal over the F1-U interface between DU 208 and CU-UP1 304 a value of UL bitrate per DRB, and DU 208 may ensure that the UE's UL bitrate over such DRB is limited to the signaled value.

While the above techniques are summarized using NG terminology (e.g., gNB-CU and gNB-DUs), it will be appreciated that these techniques may be generalized, for use in a wireless communication system that includes a control unit that is connected to multiple distributed units or radio access points. In other words, the techniques are applicable to all architectures where a DU-CU split can be foreseen.

Figure 4A:
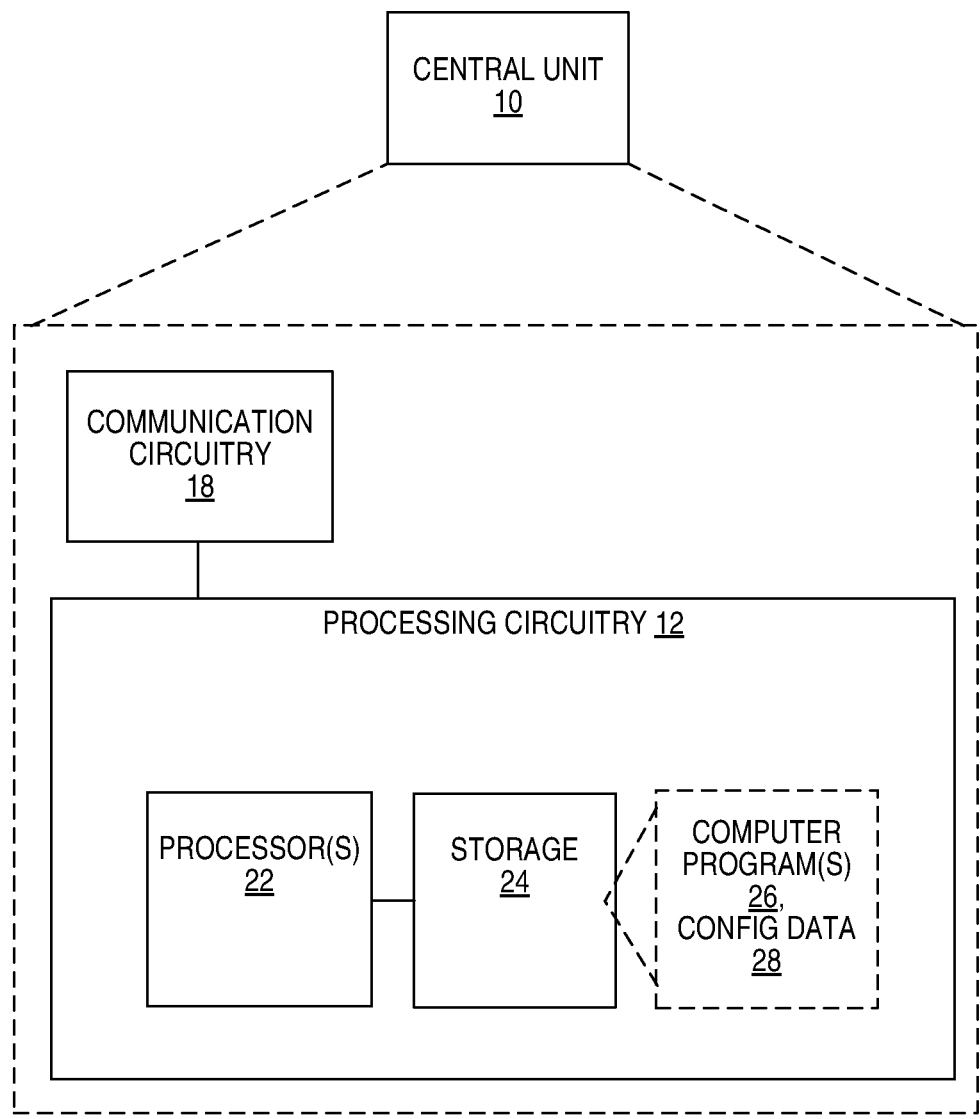
FIGS. 4A-4B are block diagrams of a central unit, according to some embodiments.

FIG. 4A illustrates a network node that may represent one or more network nodes that operate in accordance with these techniques, as a central unit 10. The central unit 10 may be part of a base station, or gNB. The central unit 10 (e.g., gNB-CU) may be connected to and control radio access points, or distributed units (e.g., gNB-DUs). The central unit 10 includes communication circuitry 18 for communicating with radio access points (gNB-DUs) and with other equipment in the core network (e.g., 5GC).

The central unit 10 further includes processing circuitry 12 that is operatively associated with the communication circuitry 18. In an example embodiment, the processing circuitry 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 12 may comprise fixed circuitry, or programmable circuitry that is specially configured via the execution of program instructions implementing the functionality taught herein.

The processing circuitry 12 also includes or is associated with storage 24. The storage 24, in some embodiments, stores one or more computer programs 26 and, optionally, configuration data 28. The storage 24 provides non-transitory storage for the computer program 26 and it may comprise one or more types of computer-readable media, such as disk storage, solid-state memory storage, or any mix thereof. By way of non-limiting example, the storage 24 comprises any one or more of SRAM, DRAM, EEPROM, and FLASH memory.

In general, the storage 24 comprises one or more types of computer-readable storage media providing non-transitory storage of the computer program 26 and any configuration data 28 used by the control unit 10. Here, "non-transitory" means permanent, semi-permanent, or at least temporarily persistent storage and encompasses both long-term storage in non-volatile memory and storage in working memory, e.g., for program execution.

Figure 4B:
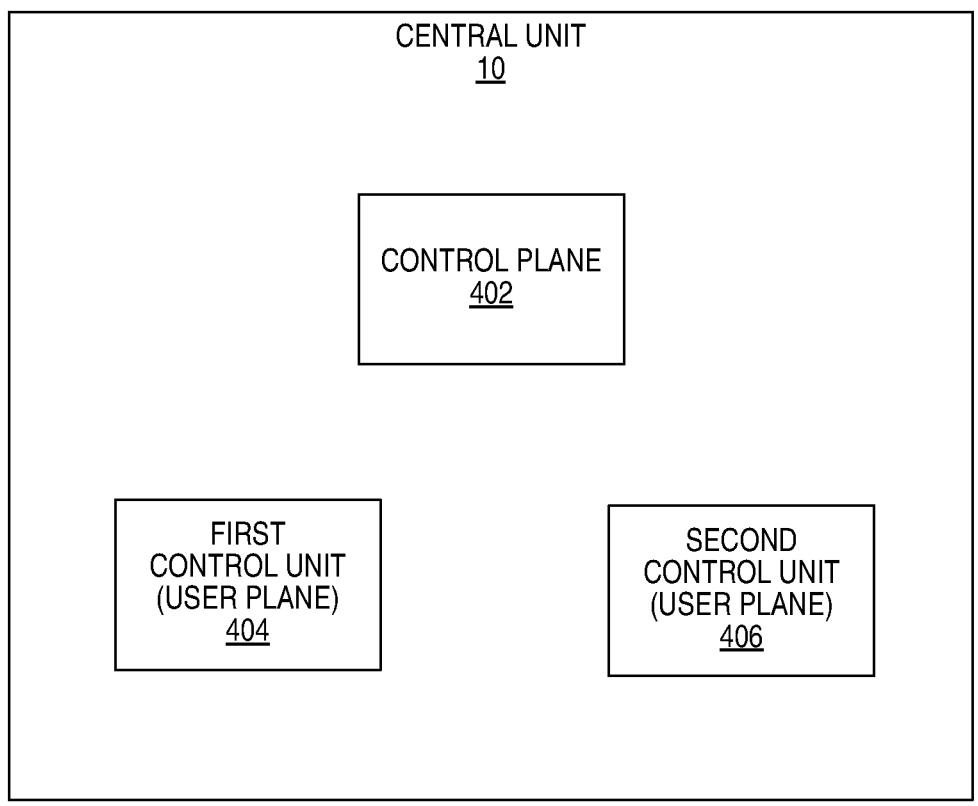

As explained earlier, a gNB-CU may be split into multiple entities. This includes gNB-CU-UPs, which serve the user plane and host the PDCP protocol, and one gNB-CU-CP, which serves the control plane and hosts the PDCP and RRC protocol. These two entities are shown as separate control units in FIG. 4B, as control plane 402 and first and second (user plane) control units 404, 406. Control plane 402 and control units 404, 406 may be comparable to CU-CP 302, CU-UP1 304 and CU-UP2 306 in FIG. 3. While FIG. 4 shows both the control plane 402 and control units 404, 406 within central unit 10, as if located with the same unit of a network node, in other embodiments, the control units 404, 406 may be located outside the unit where the control plane 402 resides, or even in another network node. Without regard to the exact arrangement, the processing circuitry 12 may be considered to be the processing circuitry in one or more network nodes necessary to carry out the techniques described herein, whether the processing circuitry 12 is together in one unit or whether the processing circuitry 12 is distributed in some fashion.

In some embodiments, the processor(s) 22 of the processing circuitry 12 may execute a computer program 26 stored in the storage 24 that configures the processor(s) 22 to manage bitrates for DRBs for a UE served by two or more distributed transmission units, where the DRBs include at least one DRB terminating at a first control unit and at least one DRB terminating at a second control unit. The processing circuitry 12 may be configured to determine at least a first UL AMBR value for the UE for the first control unit and at least a second UL AMBR value for the UE for the second control unit. The processing circuitry 12 is configured to signal, via the communication circuitry 18, the first UL AMBR to the first control unit and the second UL AMBR to the second control unit, for enforcement by the first and second control units. These operations may be performed by a control plane 402 portion of the central unit 10.

The determination and signaling may be carried out by a gNB central unit for the control plane (gNB CU-CP), and the first and control units may be first and second gNB CUs for the user plane (gNB CU-UPs). The first and second control units may host first and second PDCP terminations, respectively, for the UE.

Figure 5:
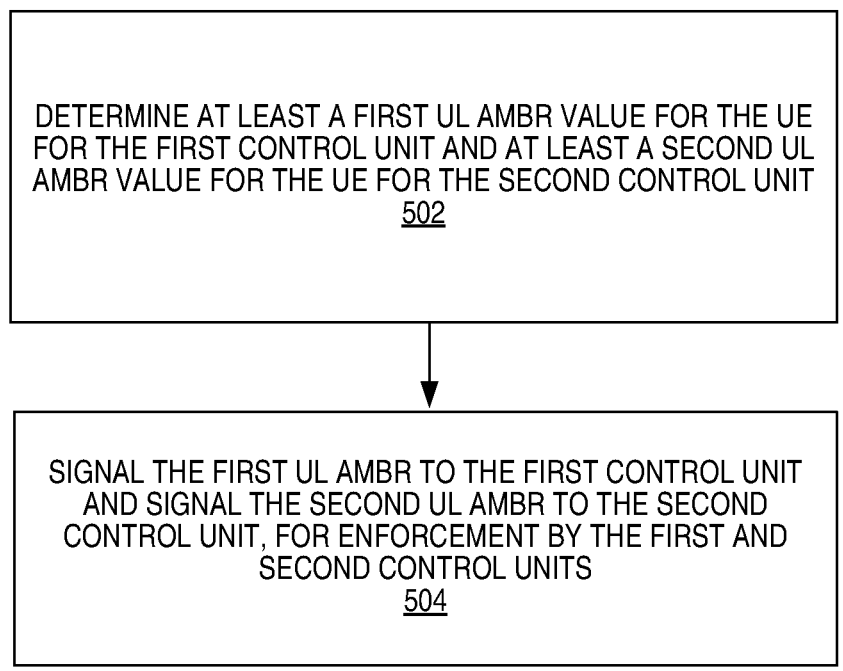
FIG. 5 illustrates a method carried out by the central unit (e.g., control plane), according to some embodiments.

The processing circuitry 12 may also be configured to perform a corresponding method 500, shown by FIG. 5. The method 500 includes determining at least a first UL AMBR value for the UE for the first control unit and at least a second UL AMBR value for the UE for the second control unit (block 502) and signaling the first UL AMBR to the first control unit and signaling the second UL AMBR to the second control unit, for enforcement by the first and second control units (block 504).

The first UL AMBR value may be an aggregated value for two or more DRBs for the UE terminated at the first control unit, and the second UL AMBR value may be an aggregated value for two or more DRBs for the UE terminated at the second control unit.

Method 500 may include determining the UL AMBRs by determining a UL AMBR value for each of multiple DRBs for the UE terminated at the first control unit and determining a UL AMBR value for each of multiple DRBs for the UE terminated at the second control unit, and the signaling may include signaling the UL AMBR values to the respective control units.

Method 500 may also include enforcing the first and second UL AMBR values at the first and second control units, respectively. This enforcement may include monitoring UL traffic bitrates for the DRBs of the UE terminated at the respective control unit, with respect to the respective UL AMBR values. When the determination involves determining a UL AMBR value for each of multiple DRBs for the UE terminated at the first control unit, the monitoring may include, for each of the first and second control units, monitoring a UL traffic bitrate for each of multiple DRBs terminated at the control unit, with respect to corresponding multiple UL AMBR values.

The enforcing may include, for at least one of the first and second control units, detecting that an UL traffic bitrate for one or more DRBs for the UE exceeds a corresponding UL AMBR value, and signaling an indication of a UL AMBR breach to a control plane control unit, in response to the detecting. In response to the signaling of the indication, method 500 may include receiving and implementing: an instruction to remove one or more DRBs for the UE; an instruction to limit UL traffic for one or more DRBs for the UE; and/or UL traffic bitrate limits for one or more DRBs for the UE.

In other embodiments, the processing circuitry 12 may cause the central unit 10, or a portion of the central unit 10, to act as the first control unit 404. The processing circuitry 12 is configured to receive signaling indicating at least the first UL AMBR value for the UE and enforce the first UL AMBR value for the UE.

Figure 6:
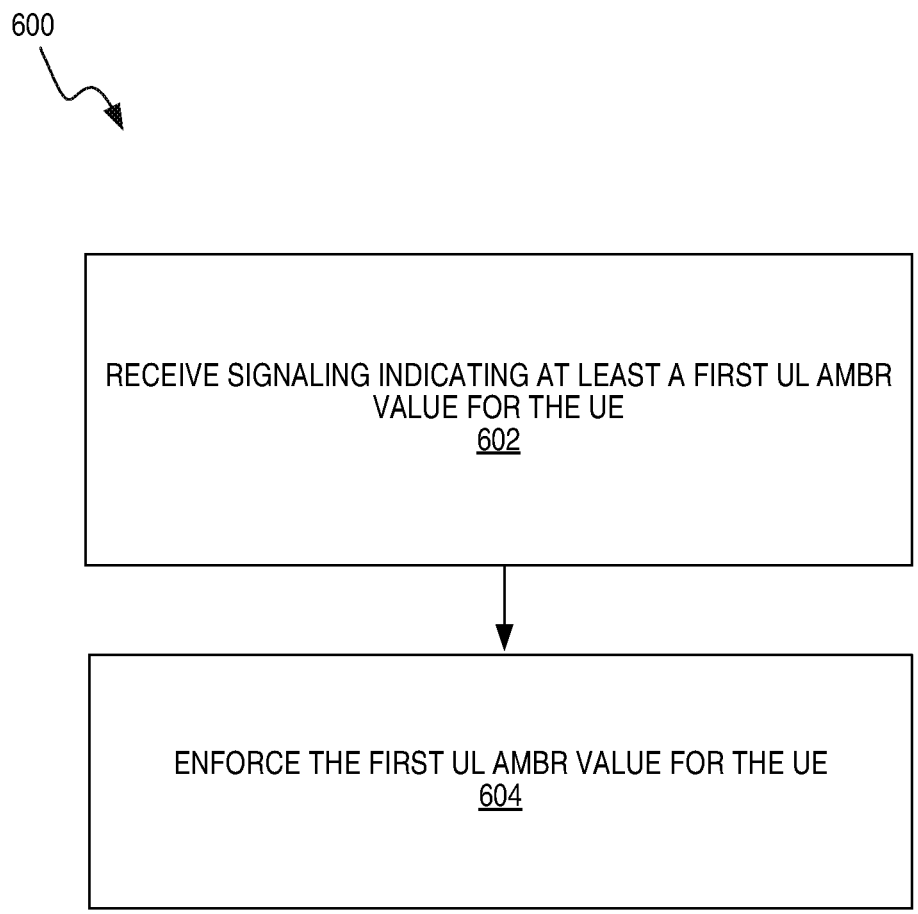
FIG. 6 illustrates a method carried out by a control unit (user plane) of the central unit, according to some embodiments.

The processing circuitry 12 may be configured to perform a corresponding method 600 for managing bitrates for DRBs. The method 600 is illustrated in FIG. 6 and includes receiving signaling indicating at least a first UL AMBR value for the UE (block 602) and enforcing the first UL AMBR value for the UE (block 604).

The receiving may include receiving a UL AMBR value for each of multiple DRBs for the UE terminated at the first control unit, and the enforcing may include enforcing each of the UL AMBR values. The enforcing may further include monitoring an aggregate UL traffic bitrate for one or more DRBs of the UE terminated at the first control unit, with respect to the first UL AMBR value.

The monitoring may include monitoring a UL traffic bitrate for each of multiple DRBs terminated at the control unit, with respect to corresponding multiple UL AMBR values received by the first control unit. The enforcing may include detecting that an UL traffic bitrate for one or more DRBs for the UE exceeds a corresponding UL AMBR value, and signaling an indication of a UL AMBR breach to a control plane control unit, in response to the detecting. In response to the signaling of the indication, the method 600 may include receiving and implementing: an instruction to remove one or more DRBs for the UE; an instruction to limit UL traffic for one or more DRBs for the UE; and/or UL traffic bitrate limits for one or more DRBs for the UE.

Figure 7:
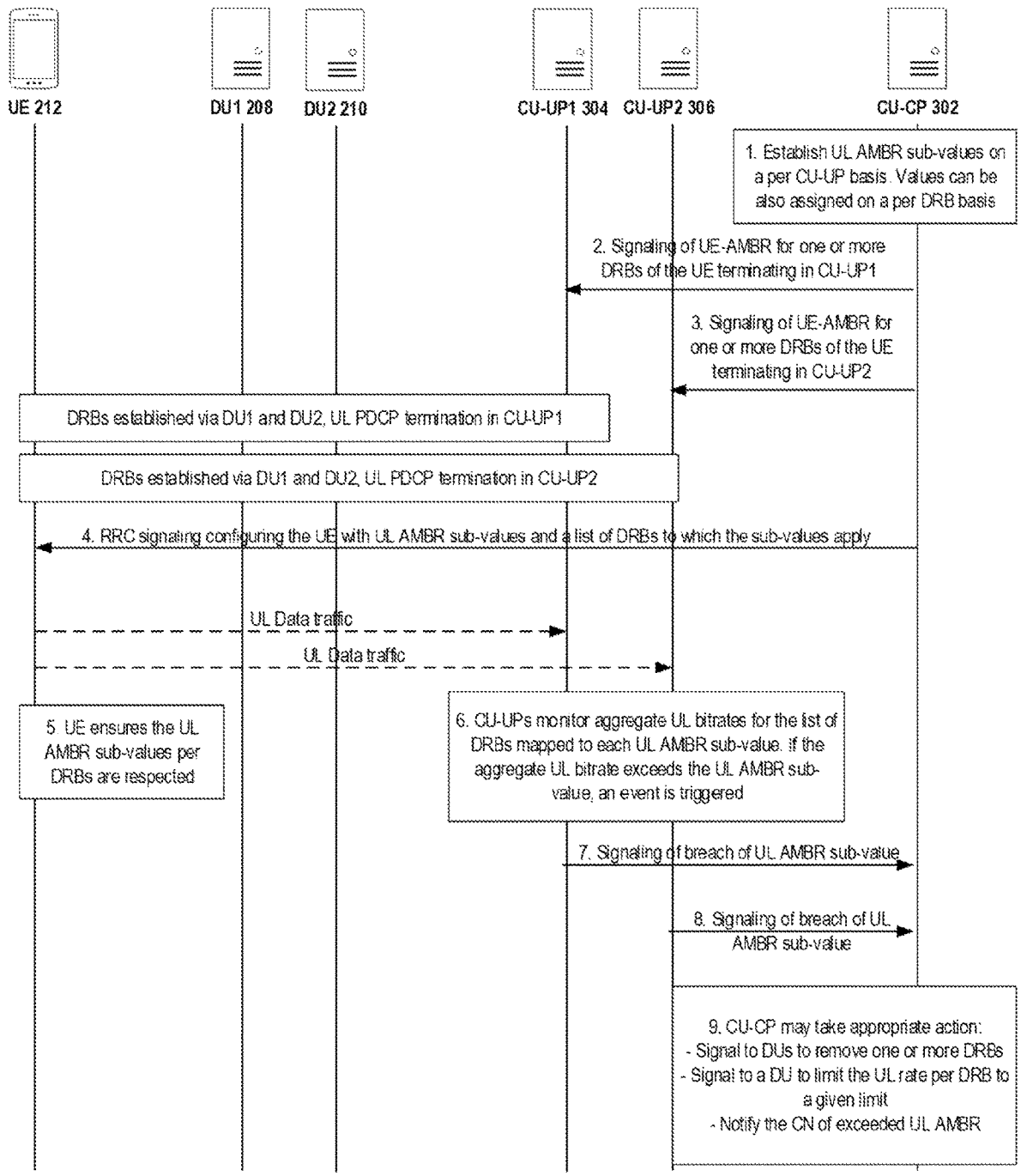
FIG. 7 is a signal chart illustrating a method of managing bitrates for DRBs, according to some embodiments.

An embodiment is also shown using the signaling chart in FIG. 7. In a first step, when DRBs need to be configured and admitted for UE 212, CU-CP 302 assigns UL AMBR sub-values. Such sub-values are lower than the overall UE UL AMBR and are mapped to one or more DRBs with termination in the same CU-UP, i.e., they have the same UL UP PDCP entity. Such sub-values can have different granularity. Namely, a sub-value of UL AMBR may be determined for all UE's DRBs terminating at a CU-UP, or one sub-value of the UL AMBR may be determined for a list of UE's DRBs with termination at the same CU-UP.

In steps two and three, CU-CP 302 signals the determined sub-values of the UL AMBR to CU-UPs 304, 306. Such signaling may occur via the E1 interface between a CU-UP 304, 306 and CU-CP 302. The signaling may include a mapping of the UL AMBR value with a list of DRB identifiers for the DRBs to which the UL AMBR applies.

In step four, either together or independently from the configuration of the admitted DRBs, CU-CP 302 may signal to UE 212 the values of the UL AMBRs derived together with the DRBs for which the values apply. The UE shall ensure that the aggregate bit rate for the signaled DRBs does not exceed the signaled UL AMBR.

In step five, during transmission of UL traffic, UE 212 ensures that the aggregate UL bitrate for one or more DRBs is equal to or lower than the UL AMBR corresponding to the DRBs.

In step six, each CU-UP 304, 306 monitors aggregates UL traffic bitrates for one or more DRBs corresponding to a configured UL AMBR. If such an aggregate bitrate exceeds the corresponding UL AMBR, CU-UP 304 or 306 detects such an event and triggers step seven.

In step seven, each CU-UP 304, 306 that detects that the aggregate UL bitrate for one or more DRBs mapped to a specific UL AMBR has exceeded the corresponding UL AMBR and signals such an event to CU-CP 302. Such signaling may occur over the E1 interface between a CU-UP 304, 306 and CU-CP 302. The signaling may report, at step eight, that a breach of the UL AMBR is detected for a number of DRBs identified via DRB IDs.

In step nine, CU-CP 302, after receiving notification from a CU-UP (e.g., CU-UP 304) of a breach of the UL AMBR established, may take a number of possible measures. CU-CP 302 may signal over the F1 interface between CU-CP 302 and a DU 208, that one or more DRBs need to be removed, such DRBs being within the group of DRBs for which the aggregate UL AMBR was not respected. CU-CP 302 may signal over the F1 interface to one or more DUs 208, 210 a value of the UL bitrate that should be enforced for one or more DRBs (such a value may be an aggregate value for a group of DRBs). DU 208 or 210 may apply such a limitation in order to bring the UL bitrate within allowed values. CU-CP 302 may signal the core network via the NG interface between a gNB and an AMF (Access and Mobility Management Function) that a breach of UL AMBR occurred for a given UE.

In another embodiment, CU-UP 304, upon detecting a breach of one of the established UL AMBR values, signals one or more DUs 208, 210 serving DRBs associated with the UL AMBR of concern with instructions on how to limit UL bitrates in a way that the aggregate bitrate can return within allowed values. Such signaling may be done over the F1-U and it may include or consist of a target UL bitrate per DRB. Upon receiving such information, DU 208 or 210 shall understand that this bitrate applies to the DRB over which the information was received. DU 208 or 210 shall be sure to perform resource allocation to UE 212 so that the signaled UL bitrate over the concerned DRB is not exceeded.

It should be noted that when a split bearer configuration is signaled to UE 212, namely when UE 212 is configured to receive traffic from the same service flows over multiple over the air links, UE 212 will be assigned the same identifier for all the radio links forming the split bearer. This identifier can be named a bearer ID. It is also noted that when the methods discuss DRB signaling between a gNB-CU and a gNB-DU and mention that these DRBs are part of a split bearer configuration, this does not necessarily mean that the DRB ID used over the F1AP needs to be the same for all F1 AP-configured-DRBs that are part of the same split bearer configuration. Over the F1AP, DRBs can be identified with different DRB IDs, even if they are part of the same split bearer configuration.

Figure 8:
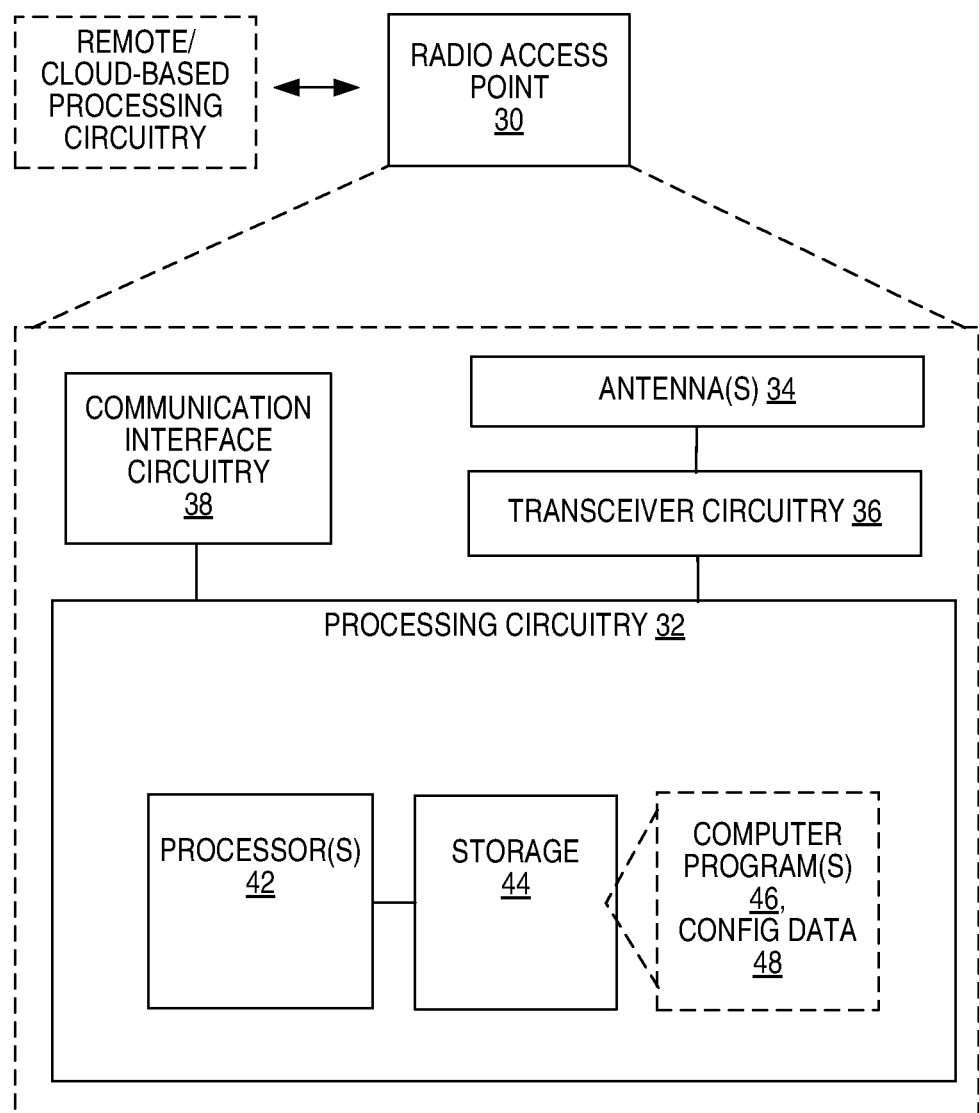
FIG. 8 is a block diagram of a radio access point (distributed unit), according to some embodiments.

FIG. 8 illustrates an example DU, shown as radio access point 30, which may be controlled by central unit 10. The radio access point 30 may be a network node that operates as a serving node and is known as or may comprise a part of a gNB, such as a gNB-DU. The radio access point 30 includes communication interface circuitry 38 for communicating with other nodes of the same type or of varying types. For example, the radio access point 30 may cooperate with a remote or cloud-based processing element that performs at least some of the processing described herein on the network side.

The radio access point 30 communicates with wireless devices operating in the network via antennas 34 and a transceiver circuitry 36. The transceiver circuitry 36 may include transmitter circuits, receiver circuits, and associated control circuits that are collectively configured to transmit and receive signals according to one or more radio access technologies, such as 5G, for communicatively coupling wireless devices to the network.

In one or more embodiments, the processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry The processing circuitry 32 also includes or is associated with storage 44. The storage 44, in some embodiments, stores one or more computer programs 46 and, optionally, configuration data 48. The storage 44 provides non-transitory storage for the computer program 46 and it may comprise one or more types of computer-readable media, such as disk storage, solid-state memory storage, or any mix thereof. By way of non-limiting example, the storage 44 comprises any one or more of SRAM, DRAM, EEPROM, and FLASH memory.

In some embodiments, the processor 42 of the processing circuitry 32 may execute a computer program 46 stored in the storage 44 that configures the radio access point 30 (e.g., gNB-DU) to operate under the control of a control unit (e.g., gNB-CU), such as central unit 10, that includes the split control plane/user plane architecture that may be used to perform the techniques discussed above.

Figure 9:
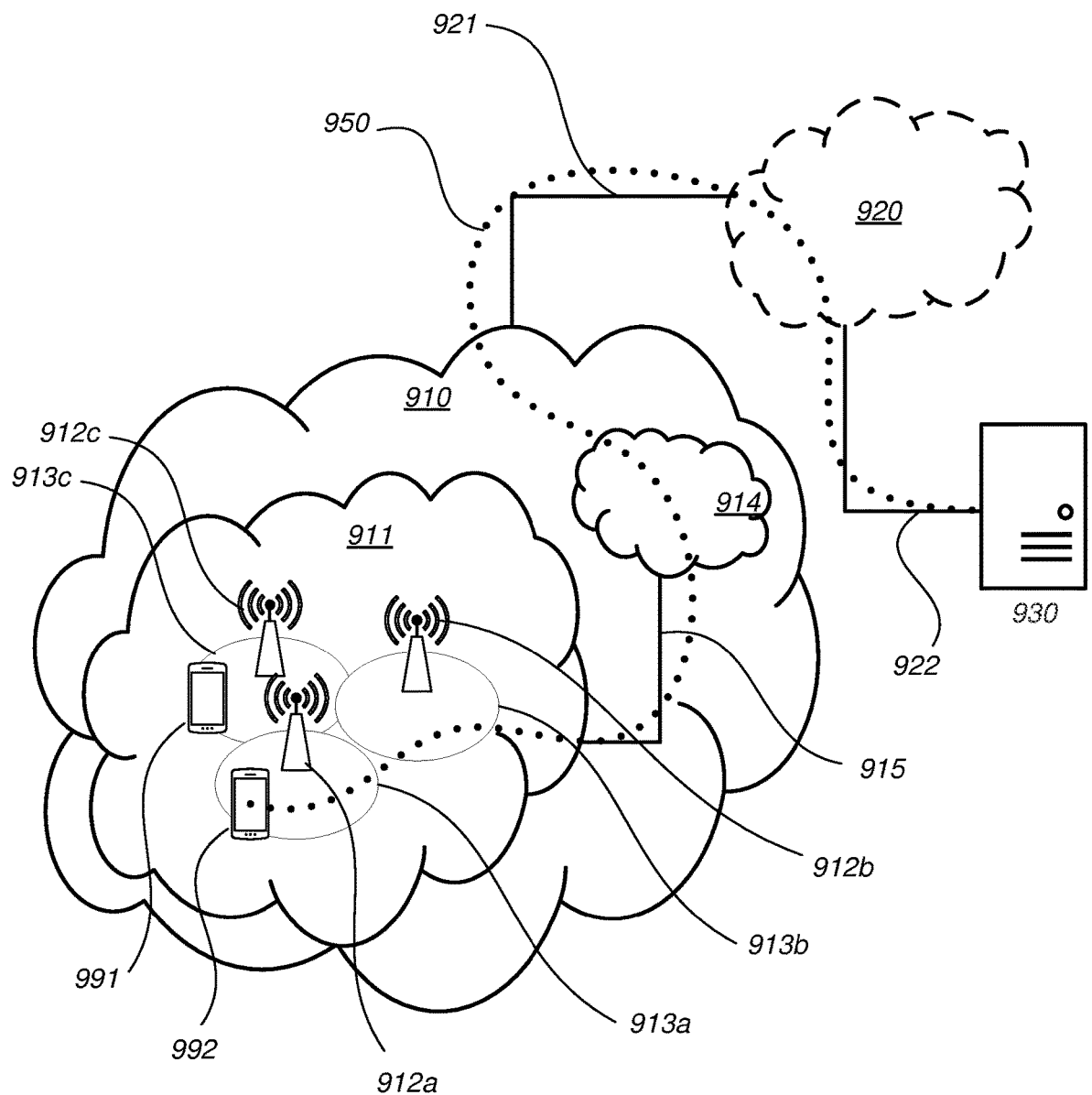
FIG. 9 illustrates an example communication system, according to some embodiments.

FIG. 9, in accordance with various embodiments, shows a communication system that includes a telecommunication network 910, such as a 3GPP-type cellular network, which comprises an access network 911, such as an gNB-RAN, and a core network 914 (e.g., 5GC). The access network 911 comprises a plurality of base stations 912a, 912b, 912c, such as gNBs or other types of wireless access points, each defining a corresponding coverage area 913a, 913b, 913c. Each base station 912a, 912b, 912c is connectable to the core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware enabling it to communicate with the host computer 1010 and with the UE 1030. The hardware may include a communication interface for setting up and maintaining a wired or wireless connection with an interface of a different communication device of the communication system 1000, as well as a radio interface for setting up and maintaining at least a wireless connection 1070 with a UE 1030 located in a coverage area (not shown in FIG. 10) served by the base station 1020. The communication interface may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the base station 1020 comprises a central unit 10 (e.g., gNB-CU) that controls radio access points 30 (e.g., gNB-DUs) that communicate with and may perform handover for the UE 930. The details of the central unit 10 and a radio access point 30 were described earlier with reference to FIGS. 4A and 8.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
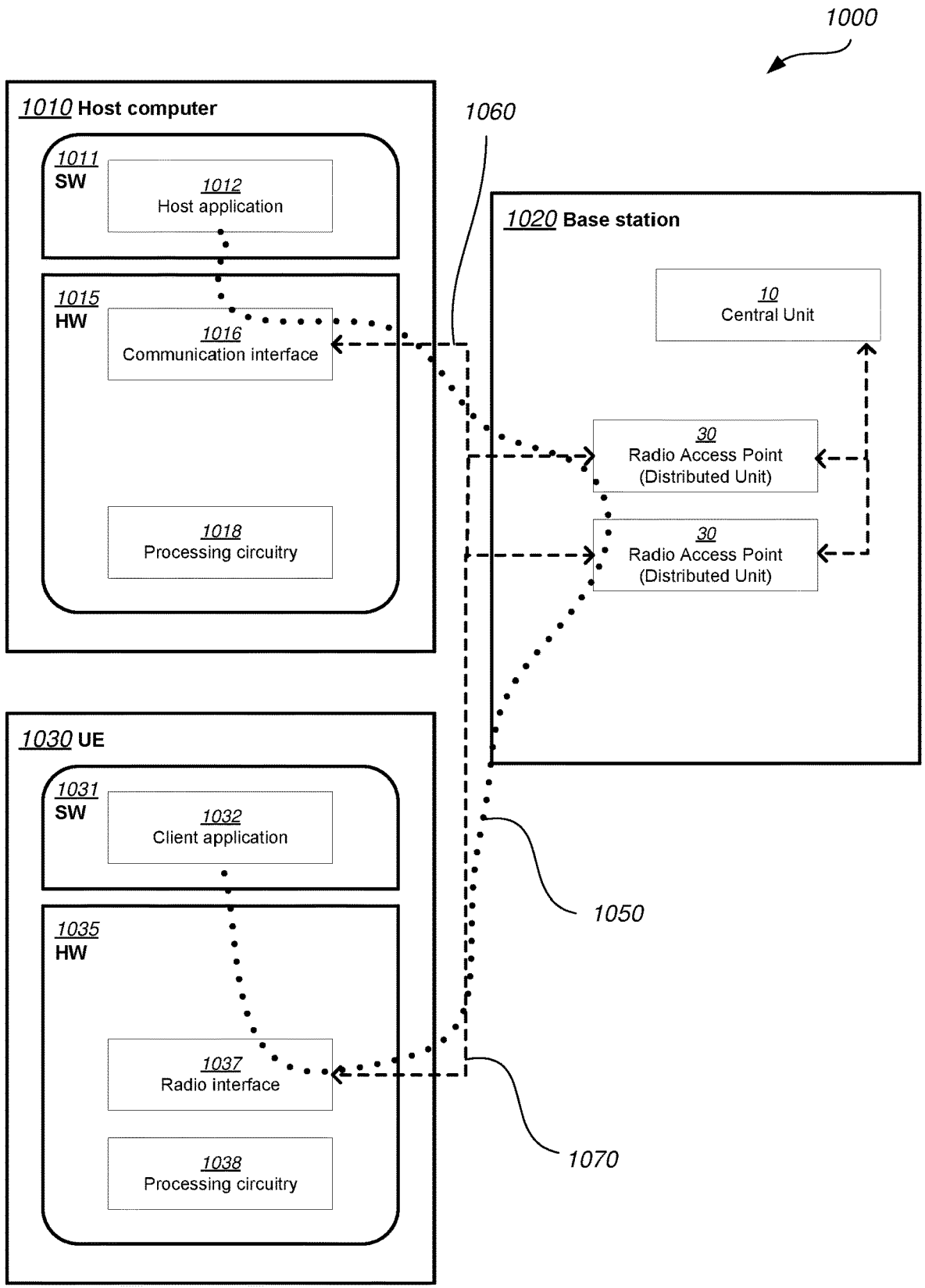
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve UL AMBR management and enforcement, which will result in improved performance, such as better and/or more consistent throughput, and/or reduced delays, for users of the RAN.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
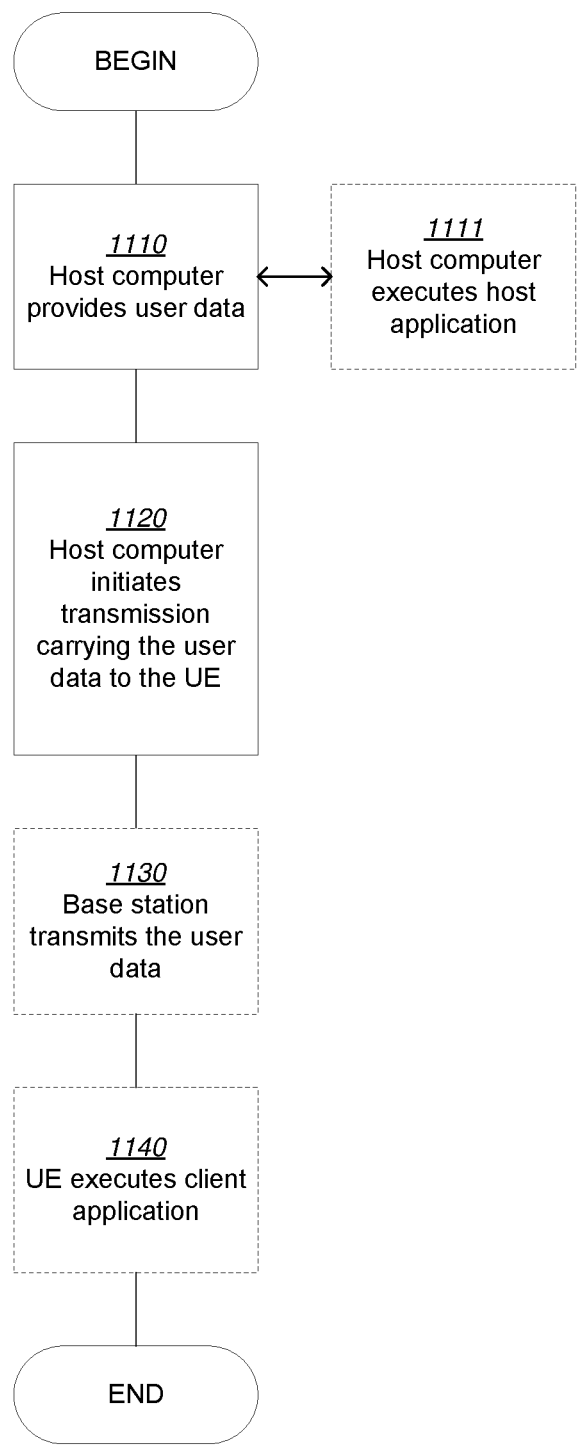
FIG. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
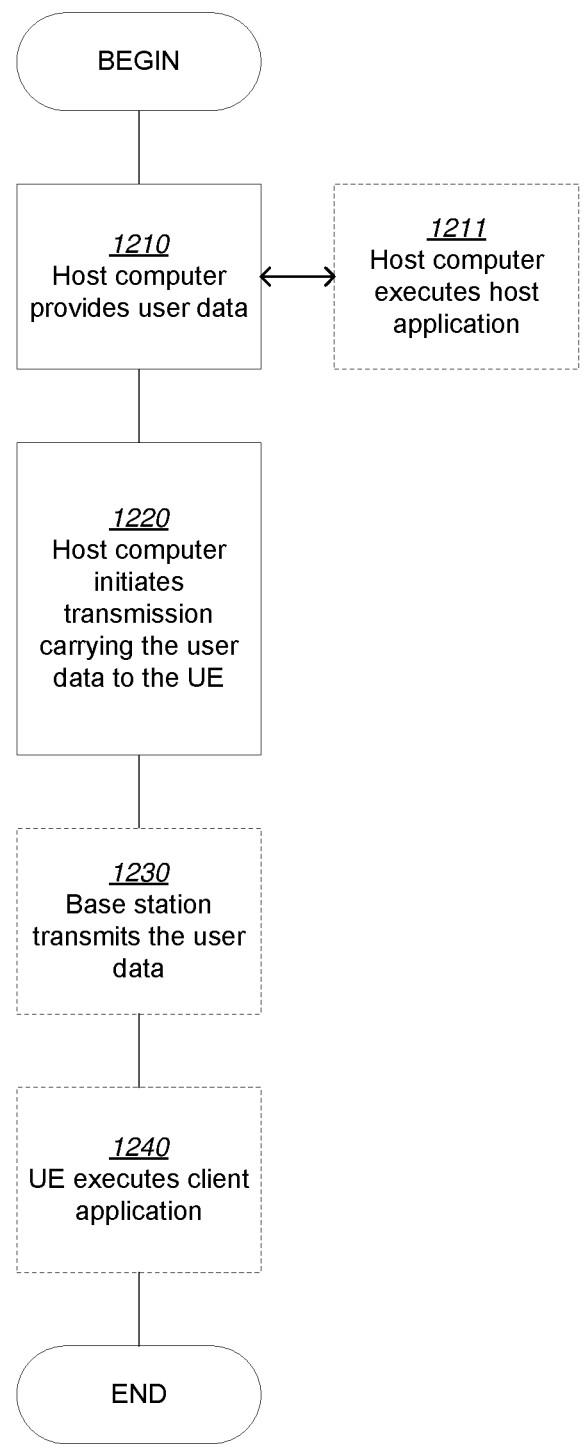

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional sub step 1211, the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission. In a fourth step 1240, the UE executes client application.

Figure 13:
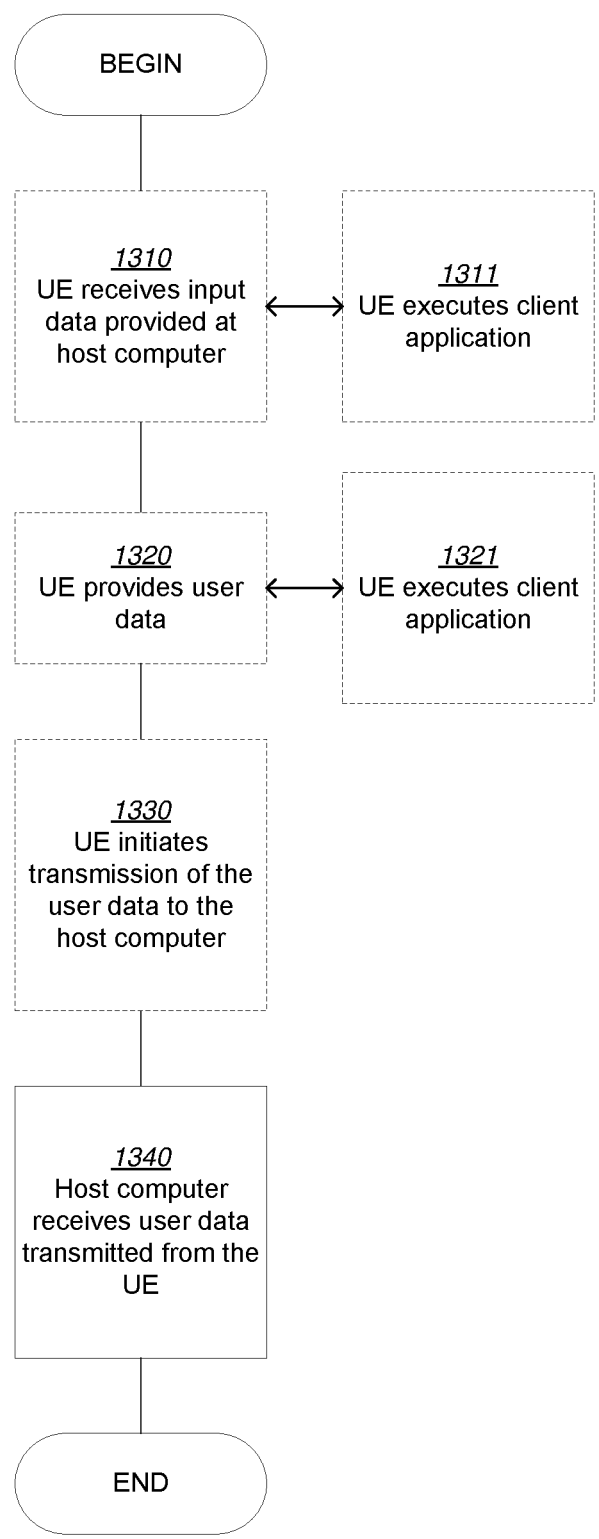

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

Figure 14:
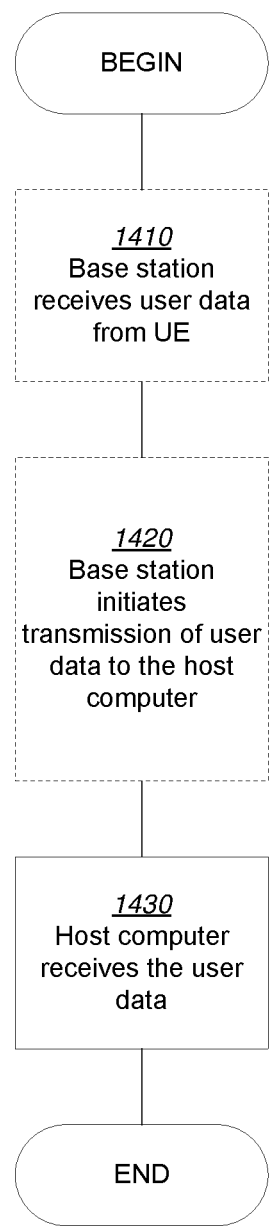

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

One of the corresponding example embodiments may include a method implemented in a communication system including a host computer, a base station and a UE. The method includes, at the host computer, providing user data and, at the host computer, initiating a transmission carrying the user data to the UE via a cellular network comprising the base station. The base station performs a method for managing bitrates for DRBs for a UE served by two or more distributed transmission units, the DRBs including at least one DRB terminating at a first control unit and at least one DRB terminating at a second control unit. The method includes determining at least a first UL AMBR value for the UE for the first control unit and at least a second UL AMBR value for the UE for the second control unit. The method also includes signaling the first UL AMBR to the first control unit and signaling the second UL AMBR to the second control unit, for enforcement by the first and second control units. The method may include, at the base station, transmitting the user data. The user data may be provided at the host computer by executing a host application, the method further comprising, at the UE, executing a client application associated with the host application.

In another embodiment, a method implemented in a communication system including a host computer, a base station, and a UE includes, at the host computer, receiving, from the base station, user data originating from a transmission which the base station has received from the UE, wherein the base station performs a method for managing bitrates for DRBs for a UE served by two or more distributed transmission units, the DRBs including at least one DRB terminating at a first control unit and at least one DRB terminating at a second control unit. The method includes determining at least a first UL AMBR value for the UE for the first control unit and at least a second UL AMBR value for the UE for the second control unit. The method also includes signaling the first UL AMBR to the first control unit and signaling the second UL AMBR to the second control unit, for enforcement by the first and second control units. The method may include, at the base station, receiving the user data from the UE. The method may further include, at the base station, initiating a transmission of the received user data to the host computer.

According to an embodiment, a communication system including a host computer comprises processing circuitry configured to provide user data and a communication interface configured to forward the user data to a cellular network for transmission to a UE. The cellular network comprises a base station having communication circuitry and processing circuitry, the base station's processing circuitry configured to manage bitrates for DRBs for a UE served by two or more distributed transmission units, the DRBs including at least one DRB terminating at a first control unit and at least one DRB terminating at a second control unit. Managing the bitrates includes determining at least a first UL AMBR value for the UE for the first control unit and at least a second UL AMBR value for the UE for the second control unit and signaling the first UL AMBR to the first control unit and signaling the second UL AMBR to the second control unit, for enforcement by the first and second control units. The communication system may include the base station and may further include the UE, where the UE is configured to communicate with the base station. The processing circuitry of the host computer may be configured to execute a host application, thereby providing the user data, and the UE may comprise processing circuitry configured to execute a client application associated with the host application.

According to an embodiment, a communication system includes a host computer comprising a communication interface configured to receive user data originating from a transmission from a UE to a base station, where the base station is configured to manage bitrates for DRBs for a UE served by two or more distributed transmission units. The DRBs include at least one DRB terminating at a first control unit and at least one DRB terminating at a second control unit, and the base station comprises a radio interface and processing circuitry. The base station's processing circuitry is configured to determine at least a first UL AMBR value for the UE for the first control unit and at least a second UL AMBR value for the UE for the second control unit. The processing circuitry is also configured to signal the first UL AMBR to the first control unit and signal the second UL AMBR to the second control unit, for enforcement by the first and second control units. The communication system may include the base station. The communication system may further include the UE, where the UE is configured to communicate with the base station. The host computer may include processing circuitry configured to execute a host application, and the UE may be configured to execute a client application associated with the host application, thereby providing the user data to be received by the host computer.

According to an embodiment, a method implemented in a communication system includes a host computer, a base station and a UE. The method can include, at the host computer, providing user data, and at the host computer, initiating a transmission carrying the user data to the UE via a cellular network. The communication system may comprise the base station, where the base station performs a method for managing bitrates for DRBs for a UE served by two or more distributed transmission units. The DRBs include at least one DRB terminating at a first control unit and at least one DRB terminating at a second control unit. The base station acts as the first control unit. The method includes receiving signaling indicating at least a first UL AMBR value for the UE and enforcing the first UL AMBR value for the UE. The method may include, at the base station, transmitting the user data. The user data may be provided at the host computer by executing a host application. The method may further include, at the UE, executing a client application associated with the host application.

According to an embodiment, a method implemented in a communication system includes a host computer, a base station, and a UE. The method includes, at the host computer, receiving, from the base station, user data originating from a transmission which the base station has received from the UE, where the base station performs a method for managing bitrates for DRBs for a UE served by two or more distributed transmission units. The DRBs include at least one DRB terminating at a first control unit and at least one DRB terminating at a second control unit. The base station acts as the first control unit and the method includes receiving signaling indicating at least a first UL AMBR value for the UE and enforcing the first UL AMBR value for the UE. The method may include, at the base station, receiving the user data from the UE. The method may further include, at the base station, initiating a transmission of the received user data to the host computer.

According to an embodiment, a communication system includes a host computer comprising processing circuitry configured to provide user data and a communication interface configured to forward the user data to a cellular network for transmission to a UE, where the cellular network comprises a base station having communication circuitry and processing circuitry. The base station's processing circuitry is configured to manage bitrates for DRBs for a UE served by two or more distributed transmission units. The DRBs include at least one DRB terminating at a first control unit and at least one DRB terminating at a second control unit. The base station acts as the first control unit and the base station's processing circuitry is configured to receive signaling indicating at least a first UL AMBR value for the UE and enforce the first UL AMBR value for the UE. The communication system may include the base station. The communication system may further include the UE, where the UE is configured to communicate with the base station. The processing circuitry of the host computer may be configured to execute a host application, thereby providing the user data, and the UE may comprise processing circuitry configured to execute a client application associated with the host application.

A communication system may include a host computer comprising a communication interface configured to receive user data originating from a transmission from a UE to a base station, where the base station is configured to manage bitrates for DRBs for a UE served by two or more distributed transmission units. The DRBs include at least one DRB terminating at a first control unit and at least one DRB terminating at a second control unit. The base station may comprise a radio interface and processing circuitry, where the base station is configured to act as the first control unit. The base station's processing circuitry is configured to receive signaling indicating at least a first UL AMBR value for the UE and enforce the first UL AMBR value for the UE. The communication system may include the base station. The communication system may further include the UE, where the UE is configured to communicate with the base station. The host computer may comprise processing circuitry configured to execute a host application, and the UE may be configured to execute a client application associated with the host application, thereby providing the user data to be received by the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in one or more network nodes of a wireless communication system, for managing bitrates for dedicated radio bearers (DRBs) for a user equipment (UE) served by two or more distributed transmission units, the DRBs including at least one DRB terminating at a first control unit and at least one DRB terminating at a second control unit, the method comprising:
   determining at least a first uplink aggregated maximum bit rate (UL AMBR) value for the UE for the first control unit and at least a second UL AMBR value for the UE for the second control unit,
      wherein the determining comprises:
         assigning a first UL AMBR sub-value and a second UL AMBR sub-value which are lower than overall UE UL AMBR, wherein the first UL AMBR sub-value has different granularity than the second UL AMBR sub-value; mapping the first UL AMBR sub-value to each of multiple DRBs for the UE terminated at the first control unit and the second UL AMBR sub-value to each of the multiple DRB s for the UE terminated at the second control unit; and
         determining a UL AMBR value for each of multiple DRBs for the UE terminated at the first control unit and determining a UL AMBR value for each of multiple DRB s for the UE terminated at the second control unit; and
   signaling the first UL AMBR to the first control unit and signaling the second UL AMBR to the second control unit, for enforcement by the first and second control units wherein the signaling comprises signaling the UL AMBR values to the respective control units.

2. The method of claim 1, wherein the first UL AMBR value is an aggregated value for two or more DRBs for the UE terminated at the first control unit and the second UL AMBR value is an aggregated value for two or more DRBs for the UE terminated at the second control unit.

3. The method of claim 1, wherein the first and second control units host first and second Packet Data Convergence Protocol (PDCP) terminations, respectively, for the UE.

4. The method of claim 1, wherein the determining and the signaling are carried out by a gNB central unit (CU) for the control plane (CP) and wherein the first and second control units are first and second gNB CUs for the user plane (UP).

5. The method of claim 1, wherein the method further comprises enforcing the first and second UL AMBR values at the first and second control units, respectively.

6. The method of claim 5, wherein the enforcing comprises monitoring UL traffic bitrates for the DRBs of the UE terminated at the respective control unit, with respect to the respective UL AMBR values.

7. The method of claim 6, wherein:
the determining comprises determining a UL AMBR value for each of multiple DRBs for the UE terminated at the first control unit and determining a UL AMBR value for each of multiple DRBs for the UE terminated at the second control unit,
the signaling comprises signaling the UL AMBR values to the respective control units; and
the monitoring comprises, for each of the first and second control units, monitoring a UL traffic bitrate for each of multiple DRB s terminated at the control unit, with respect to corresponding multiple UL AMBR values.

8. The method of claim 6, wherein the enforcing comprises, for at least one of the first and second control units, detecting that an UL traffic bitrate for one or more DRB s for the UE exceeds a corresponding UL AMBR value, and signaling an indication of a UL AMBR breach to a control plane control unit, in response to the detecting.

9. The method of claim 8, further comprising, in response to the signaling of the indication, receiving and implementing one or more of:
an instruction to remove one or more DRB s for the UE;
an instruction to limit UL traffic for one or more DRB s for the UE; and
UL traffic bitrate limits for one or more DRB s for the UE.

10. A method for managing bitrates for dedicated radio bearers (DRBs) for a user equipment (UE) served by two or more distributed transmission units, the DRB s including at least one DRB terminating at a first control unit and at least one DRB terminating at a second control unit, the method comprising, for one or more network nodes acting as the first control unit:
receiving signaling indicating at least a first uplink aggregated maximum bit rate (UL AMBR) value for the UE,
wherein the first UL AMBR value is an aggregated value for two or more DRBs for the UE terminated at the first control unit; and
enforcing the first UL AMBR value for the UE,
wherein the receiving comprises:
receiving a first UL AMBR sub-value and a second UL AMBR sub-value which are lower than overall UE UL AMBR,
wherein the first UL AMBR sub-value has different granularity than the second UL AMBR sub-value, and
wherein the first UL AMBR sub-value is mapped to each of multiple DRB s for the UE terminated at the first control unit and the second UL AMBR sub-value is mapped to each of the multiple DRBs for the UE terminated at the second control unit; and
receiving a UL AMBR value for each of multiple DRB s for the UE terminated at the first control unit, and wherein the enforcing comprises enforcing each of the UL AMBR values.

11. One or more network nodes of a wireless communication system configured to manage bitrates for dedicated radio bearers (DRBs) for a user equipment (UE) served by two or more distributed transmission units, the DRBs including at least one DRB terminating at a first control unit and at least one DRB terminating at a second control unit, the one or more network nodes comprising:
communication circuitry; and
processing circuitry operatively associated with the communication circuitry and configured to:
determine at least a first uplink aggregated maximum bit rate (UL AMBR) value for the UE for the first control unit and at least a second UL AMBR value for the UE for the second control unit,
wherein the determining comprises:
assigning a first UL AMBR sub-value and a second UL AMBR sub-value which are lower than overall UE UL AMBR, wherein the first UL AMBR sub-value has different granularity than the second UL AMBR sub-value;
mapping the first UL AMBR sub-value to each of multiple DRBs for the UE terminated at the first control unit and the second UL AMBR sub-value to each of the multiple DRB s for the UE terminated at the second control unit; and
determining a UL AMBR value for each of multiple DRBs for the UE terminated at the first control unit and determining a UL AMBR value for each of multiple DRB s for the UE terminated at the second control unit; and
signal the first UL AMBR to the first control unit and signal the second UL AMBR to the second control unit, for enforcement by the first and second control units, wherein
the signaling comprises signaling the UL AMBR values to the respective control units.

12. One or more network nodes of a wireless communication system configured to manage bitrates for dedicated radio bearers (DRBs) for a user equipment (UE) served by two or more distributed transmission units, the DRB s including at least one DRB terminating at a first control unit and at least one DRB terminating at a second control unit, the one or more network nodes configured to act as a first control unit and comprising:
communication circuitry; and
processing circuitry operatively associated with the communication circuitry and configured to:
receive signaling indicating at least a first uplink aggregated maximum bit rate (UL AMBR) value for the UE,
wherein the first UL AMBR value is an aggregated value for two or more DRBs for the UE terminated at the first control unit; and
enforce the first UL AMBR value for the UE,
wherein the receiving comprises:
receiving a first UL AMBR sub-value and a second UL AMBR sub-value which are lower than overall UE UL AMBR,
wherein the first UL AMBR sub-value has different granularity than the second UL AMBR sub-value, and
wherein the first UL AMBR sub-value is mapped to each of multiple DRB s for the UE terminated at the first control unit and the second UL AMBR sub-value is mapped to each of the multiple DRBs for the UE terminated at the second control unit; and receiving a UL AMBR value for each of multiple DRBs for the UE terminated at the first control unit, and wherein the enforcing comprises enforcing each of the UL AMBR values.

* * * * *